INVENTORS:
KATSUYA TERANISHI,
KEN ICHIRYU,
MITSUAKI TAKENOSHITA

BY: Craig & Antonelli
ATTORNEYS

United States Patent Office 3,499,340
Patented Mar. 10, 1970

3,499,340
DRIVING APPARATUS FOR MOVING STAIRWAYS
Katsuya Teranishi, Katsuta-shi, and Ken Ichiryu and Mitsuaki Takenoshita, Hitachi-shi, Japan, assignors to Hitachi, Ltd., Tokyo-to, Japan
Filed Nov. 16, 1967, Ser. No. 683,572
Claims priority, application Japan, Nov. 16, 1966, 41/105,103
Int. Cl. F16h 7/06, 55/30
U.S. Cl. 74—229    7 Claims

ABSTRACT OF THE DISCLOSURE

In order to prevent the chain rollers in a driving apparatus for moving stairs or escalators from clashing against the sprocket teeth which drive the chains, the sprocket teeth roots are each provided with resilient members, each of which is inserted into a circular hole formed radially at the teeth root in such a manner that the top portion thereof projects beyond the teeth root by an appropriate amount just sufficient to cushion the chain rollers when they are received between the teeth.

---

This invention relates to sprocket wheels for endless drive chains, and more particularly to silently operable sprocket wheels for escalators.

The silently operable sprocket wheels of the present invention are particularly well suited for supporting and driving the stairway steps in moving stairways. Heretofore, considerable difficulty has been experienced in attempting to drive such stairway steps silently because the endless chains which carry the steps clash with their drive wheels at the lower and upper landings. Prior installations have included tires on the step chain rollers or resilient facings for the teeth of the step chain sprocket wheels which were vulcanized on metal pieces attached to the teeth or cams for guiding the step chains into engagement with their sprocket wheels.

Other prior installations have included the resilient inserts on a sprocket wheel which are inserted in lateral grooves formed at the roots of the sprocket teeth to cushion the chain roller as well as to support it. These attempts are generally unsatisfactory; among other things, the tires on the step chain rollers are of high cost, the resilient facings on the sprocket teeth are of high cost and have a short life in the field, the cams do not solve the problem of noise, and the resilient insert which is inserted in a lateral groove formed at the roots of the sprocket teeth has drawbacks not only because its construction becomes complicated but also because the resilient insert receives substantially all of the radial impact force when it meets the chain roller so as to cushion and support the chain roller by itself, and thereby tends to be broken by the impact force due to fatigue or shock. When a particular insert is broken, the corresponding chain roller to be supported on the particular insert will drop into the lateral grooves. This can be considered as an apparent change in the pitch of the sprocket teeth. The consequence is that the succeeding or preceeding chain roller which is at a constant distance away from the dropped chain roller can not be received properly by the succeeding or preceding teeth root, resulting in the chain being cut off or becoming disengaged from the sprocket.

Accordingly, one object of the present invention is to provide a silent driving apparatus of relatively simple construction for driving endless chains.

Another object of the invention is to provide a silent driving apparatus in which the endless chain will not be broken or become disengaged from the driving apparatus even when the means for preventing clashing therebetween is broken.

Still another object of the invention is to provide a relatively silent sprocket wheel for operating escalator drive chains.

Other objects and advantages will be apparent from the following description in which reference is had to the accompanying drawings. Preferred forms of the silent driving apparatus according to the invention are illustrated in the accompanying drawings.

In the drawings.

The specific figures and the accompanying description are intended merely to illustrate the invention and not to limit its scope. Throughout the drawings, like reference numerals are employed to denote corresponding parts, whenever possible.

Figure 1:
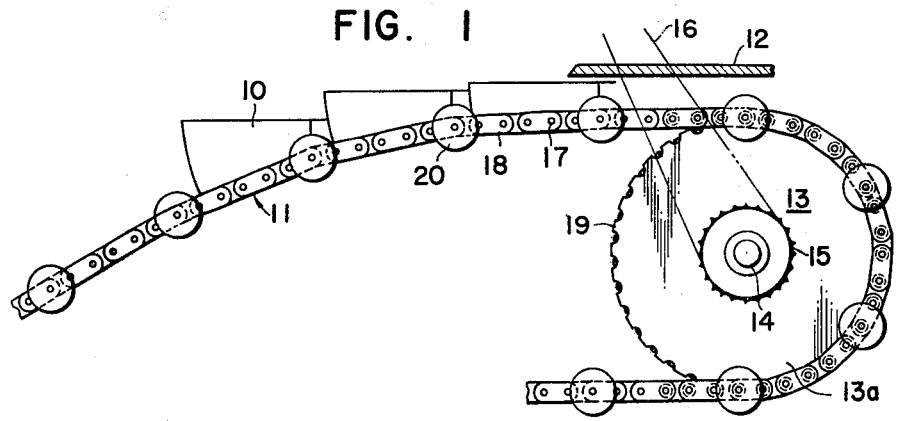
FIGURE 1 is a fragmentary view in upper side elevation of the stairway steps in a moving stairway provided with silently operable step chain wheels according to the invention.

A moving stairway comprises an endless series of movable steps 10 disposed to be moved along tracks by means of endless drive chains 11 between an upper landing 12 and a lower landing (not shown), as described, for example, in U.S. Patent No. 2,981,397 issued on Apr. 25, 1961 to Hans E. Hansen. Each of the drive chains 11 is supported at the landings by sprocket wheels 13, one idler wheel (not shown) and another drive wheel 13a, that are driven by means of a motor operatively connected to a shaft 14 upon which the drive wheels 13a are mounted, as also shown and described in the foregoing patent.

A traveling flexible endless handrail (not shown) is provided at each side of the steps 10 in the well-known manner, and is driven at the same speed as the steps. Each of the handrails is mounted on a drive sheave at the upper landing and on an idler sheave at the lower landing, as also shown and described in the foregoing patent. An endless chain 16 is disposed over a sprocket 15 attached to the drive step chain sprocket wheel 13a and over a sprocket wheel attached to one of the handrail drive sheaves and drives the handrails in accordance with movement of the stairway steps 10.

The endless chain 11 includes a plurality of rollers 17 which are linked in the conventional way by means of side plates or links 18 and has a pitch the same as that of the teeth 19 in the sprocket wheels 13 so that the chain rollers 17 are received in every space between the teeth; i.e., in the teeth roots. Journal rollers 20 are carried by one in every sixth chain rollers 17 at the outside of links 18, as viewed in FIGURE 1, and they are movable along the foregoing tracks. The sprocket wheels 13 are identical; hence, a description of one can be applied also to an idler wheel (not shown).

Considerable difficulty has been experienced heretofore in preventing clashing between the rollers 17 and the teeth 19 at the time of engagement thereof and particularly when the rollers first meet the teeth at the end of their straight path of travel. The essence of the invention is the provision of cushioning means of a simple construction on the wheels 13 for producing a relatively silient drive which only receives a part of the impact force exerted by the chain roller when the insert meets the chain roller.

Figure 2:
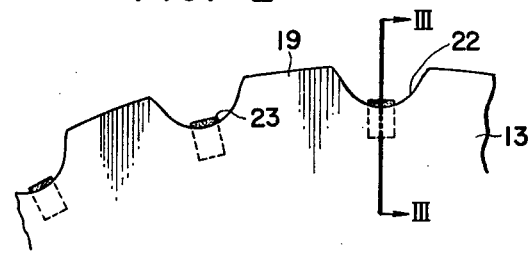
FIGURE 2 is an enlarged, fragmentary view of the wheel which is illustrated in FIGURE 1.
Figure 3:
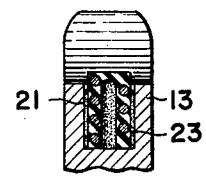
FIGURE 3 is an enlarged vertical sectional view, taken along the line III—III of FIGURE 2.

Vertical holes 21 which are preferably circularly shaped, as viewed in FIGURE 2, are formed at the roots 22 of the sprocket teeth 19. A resilient insert 23 of rubber or rubber-like material which conforms to the space of the circularly shaped holes 21, as viewed in FIGURE 2, is received in each of the holes. The normal diameter of the resilient insert 23, as viewed in FIGURE 2, is preferably chosen a little greater than that of the hole 21 so that it is necessary to force the insert into the hole. Accordingly, the insert remains in the hole during operation of the moving stairways by its own resilience without the need for any adhesives or any other fastening means. The normal height of the resilient insert 23, as viewed in FIGURES 2 and 3, is a little greater than the depth of the hole so that the resilient insert projects out of the hole beyond the teeth root 14 by an amount just enough to cushion the chain roller without providing complete support thereof and a preferable amount of projection out of the hole is about 0.5–3 millimeter when the insert has a height of 15 mm.

Figure 6:
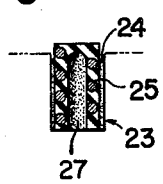
FIGURE 6 is a fragmentary sectional view of the resilient insert taken along the line VI—VI of FIGURE 5.

According to one embodiment of the invention, a resilient insert 23 of rubber or rubber-like material is preferably provided with a conventional coil spring 25 therein, as shown in FIGURE 6. Since the resilient insert 23 including coil spring 25 provide a substantially constant elasticity regardless of the rubber-like material utilized, it can be used for a longer time. As shown in the drawing, a top edge portion of the insert 23 is cut off to provide a small annular space 24 between the insert 23 and the root 22, when it is inserted in the hole 21. A vertical groove 26 is preferably also provided at the side thereof in order that air may escape therethrough when it is inserted into the hole 21.

Figure 5:
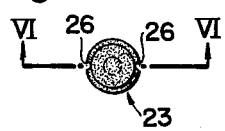
FIGURE 5 is an enlarged, plane view of the resilient insert.
Figure 4:
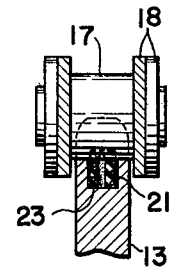
FIGURE 4 is a schematic sectional view which shows the wheel under a chain roller load that is illustrated in FIGURE 3.

According to the invention, the elastic or spring constant of the inserts is chosen to be in a range of about 50 to 300 kg./cm., and preferably is from 100 to 150 kg./cm. The hardness of the rubber is chosen from 50 to 70 degrees, preferably from 58 to 63 degrees Shore hardness. The insert shown in FIGURES 5 and 6 has an outer diameter of 11 mm. and a height of 15 mm. The diameter of the helical spring is about 5 mm. and the diameter of the wire to be used is about 1.8 mm. By the way, the space 27 is a hollow which was made by supporting means during formation of the insert.

The sizes and shapes of the hole 21 and of the resilient insert 23 are not critical, it only being necessary that the resilient inserts 23 be large enough to stay in the holes under their own resiliency during operation of the moving stairways and to extend out of the holes beyond the roots of the teeth just enough to effectively cushion the rollers when they are received between the teeth but support only a part of the impact force when it meets the chain roller.

In the operation of the moving stairway, the resilient inserts 23 cushion the rollers 17 as they are received between the teeth by deforming under the rollers and filling up the small annular space 24. But the spring constant and the amount of the projection out of the hole are chosen such that the resilient insert deforms into the hole only by a part of the impact force of the chain roller load. Consequently, a substantial part of the chain roller load or the impact force is received by the teeth root portions left around the hole. Because of this cushioning operation of the resilient insert, there is no clashing noise and because the insert receives only a part of the impact force, it is not easily broken and will therefore last for a long time. The amount of the impact force of the chain roller load is about 120–240 kg. for normal moving stairways of 4.5–5 m. height. According to the invention, the resilient insert receives about 5–50 kg. of the impact force and the teeth root portions around the hole receive the rest.

Though the hole 21 is preferably of circular shape because of the simple construction thereof, it may be oval shaped or slot shaped provided a sufficient part of the teeth root around the hole is left to support the substantial radial impact force when the chain rollers are received between the teeth. In this way the insert may function only to cushion the chain roller at the initial meeting therewith. If circularly shaped holes are employed, they may be easily constructed by usual drilling and the invention can also be applied to such a driving sprocket wheel as was installed already.

We have shown and described one embodiment in accordance with the present invention.

We claim:

1. In an escalator including a plurality of stairway steps and chain means to carry said steps in an endless procession, a sprocket wheel to drive said chain means, said wheel having a plurality of peripherally spaced teeth forming interposed teeth roots engageable with said chain means, at least the majority of said teeth roots each being provided with at least one hole smaller in area than the teeth root itself, an elastic member inserted into each hole and projecting slightly therefrom to partially cushion the impact force when said chain means engages each of said teeth roots, the improvement essentially comprising: said elastic member and said hole being relatively dimensioned to provide a space therebetween so that the top of said elastic member may be on the same level with the surface of each of said teeth roots after said elastic member has partially cushioned the impact force occurring between said chain means and each of said teeth roots upon initial engagement.

2. The combination defined in claim 1 wherein said hole is formed substantially radially into the wheel and the elastic member projects from said hole by an amount sufficient only to cushion the chain roller by supporting a minor part of the impact force exerted by the chain roller on each tooth root.

3. The combination defined in claim 1, wherein the elastic member is made of rubber-like material and includes a helical spring therein.

4. The combination defined in claim 3, wherein the rubber-like material has a hardness of 50–70 degrees Shore hardness.

5. The combination defined in claim 1, in which the elastic member has at least one vertical groove in the side thereof so that air may escape therethrough as the elastic member is being inserted in said hole.

6. The combination defined in claim 1 wherein the amount of protection of the elastic member out of the teeth root is about 0.5–3.0 millimeters.

7. The combination defined in claim 1, wherein the spring constant of the elastic member is about 50–300 kg./cm.

References Cited

FOREIGN PATENTS 653,577   12/1962   Canada.

OTHER REFERENCES

German printed application No. 1,040,335, October 1958, Trippe.

MILTON KAUFMAN, Primary Examiner

JAMES A. WONG, Assistant Examiner

U.S. Cl. X.R.

74—243; 198—16